(No Model.) 3 Sheets—Sheet 1.

D. M. MOTHERWELL.
CULTIVATOR.

No. 602,663. Patented Apr. 19, 1898.

Witnesses
Wm. F. Henning
Charles L. Stine

Inventor
David M. Motherwell
by Dwight B. Cheever
Atty.

(No Model.) 3 Sheets—Sheet 2.

D. M. MOTHERWELL.
CULTIVATOR.

No. 602,663. Patented Apr. 19, 1898.

Witnesses
Wm. J. Heming
Charles L. Hine

Inventor
David M. Motherwell
By Dwight B. Cheever
Atty.

(No Model.) 3 Sheets—Sheet 3
D. M. MOTHERWELL.
CULTIVATOR.
No. 602,663. Patented Apr. 19, 1898.
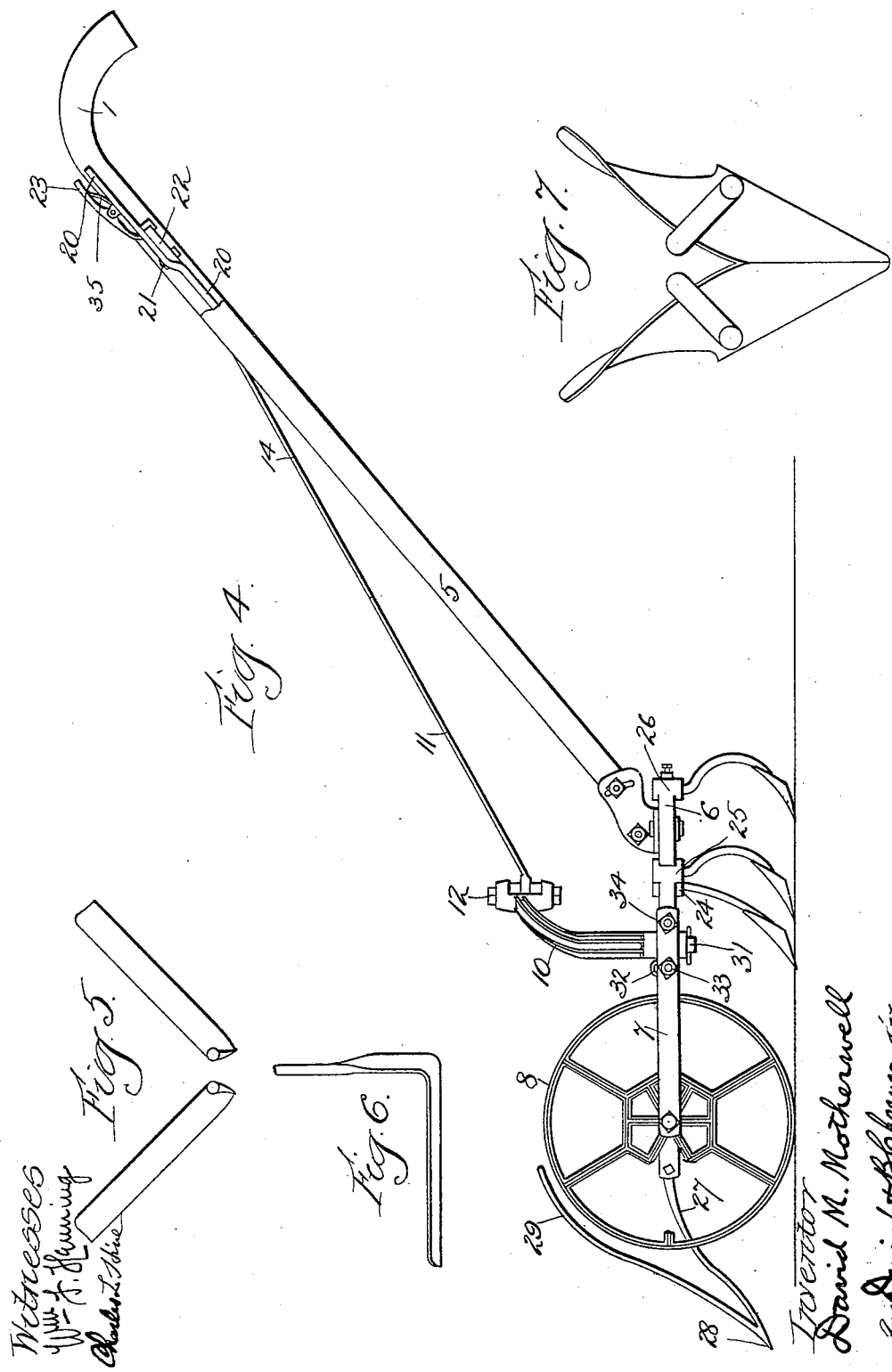

UNITED STATES PATENT OFFICE.

DAVID M. MOTHERWELL, OF CHICAGO, ILLINOIS, ASSIGNOR TO THE WHITMAN & BARNES MANUFACTURING COMPANY, OF AKRON, OHIO.

CULTIVATOR.

SPECIFICATION forming part of Letters Patent No. 602,663, dated April 19, 1898.

Application filed October 14, 1897. Serial No. 655,201. (No model.)

*To all whom it may concern:*

Be it known that I, DAVID M. MOTHERWELL, a citizen of the United States, and a resident of Chicago, in the county of Cook and State of Illinois, have invented a certain new and useful Improvement in Cultivators, of which the following is a specification in its best form now known to me.

My invention relates to cultivators, and is particularly adapted to garden-cultivators intended to be pushed by hand. Its object is to provide a cultivator which can be readily adjusted to meet the different conditions and different kinds of work successively required in gardening and which will possess peculiar advantages in this work.

It consists in a peculiarly-constituted tool-frame made in sections laterally adjustable relative to each other, in the provision for supporting and adjusting these sections, and in combining therewith means for clearing the path in which each section travels and for raising and guiding such plants as may extend across the path.

Figure 1:
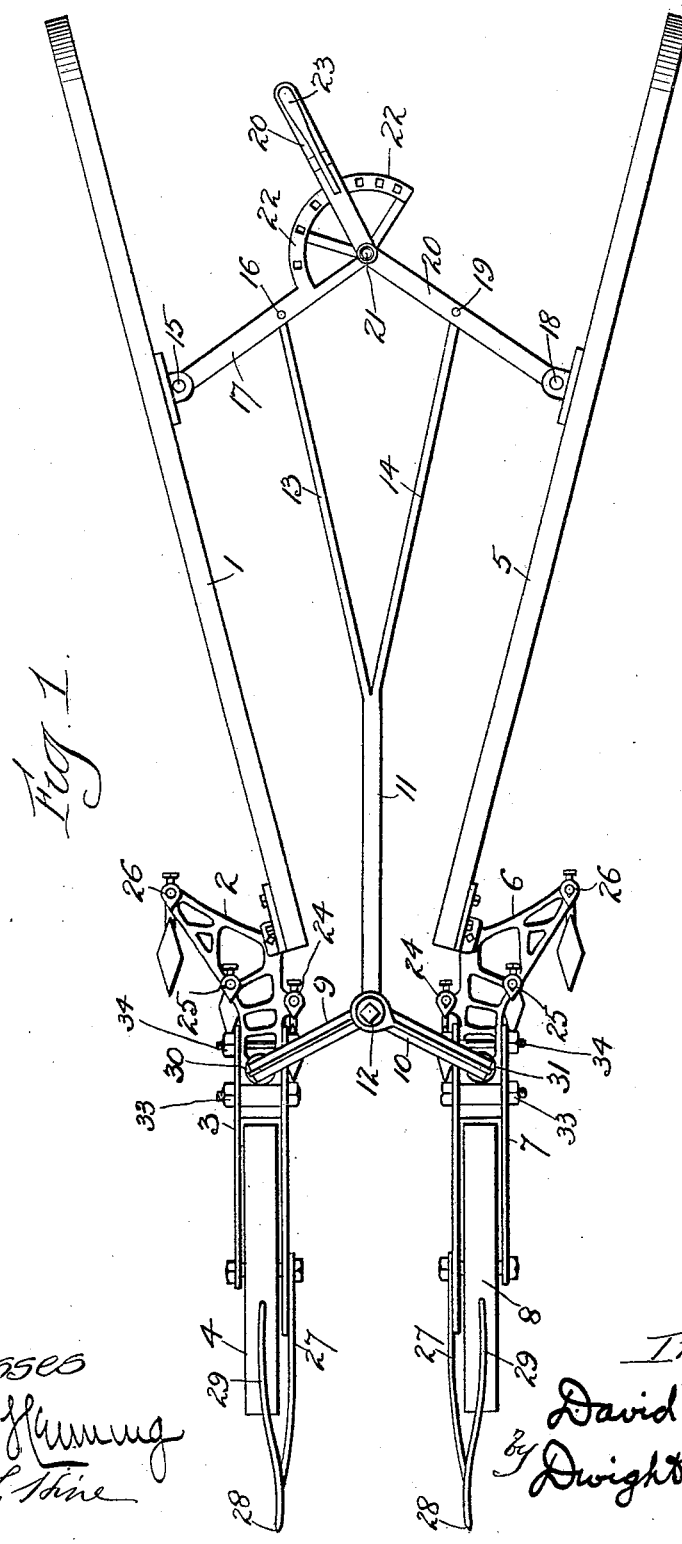
Figure 2:
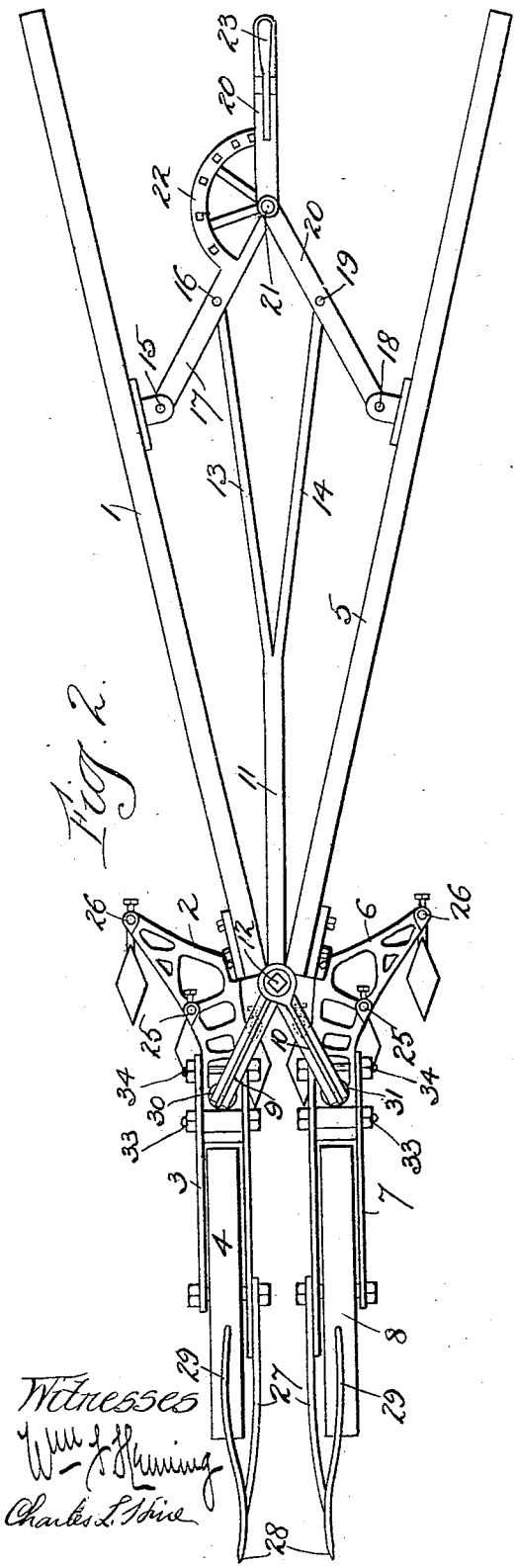
Figure 3:
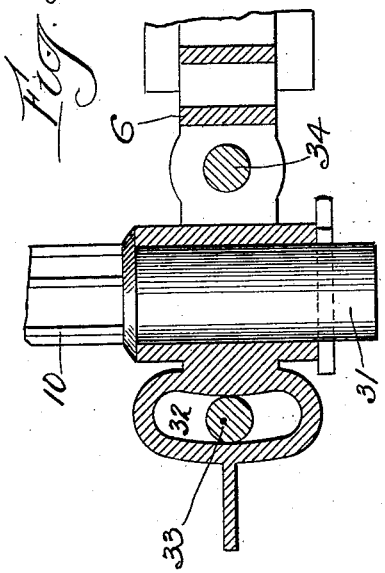

In the drawings, Figure 1 is a plan view showing my improved cultivator when spread. Fig. 2 is a plan view of the implement when closed. Fig. 3 is a detail sectional view of a part of the frame, showing the method of connecting the spreading device and the wheel-forks to the frame. Fig. 4 is a side view of Fig. 1. Fig. 5 shows a plan view of two weed-cutters. Fig. 6 is a side view of a weed-cutter. Fig. 7 is a plan view of a right and left handed plow arranged together in the form of a double plow.

Similar figures represent similar parts throughout the several views.

1 is a handle rigidly bolted to the right-hand section 2 of the tool-frame, to which is attached the wheel-fork 3 of the wheel 4.

5 is another handle rigidly bolted to the left-hand section 6 of the tool-frame, to which is attached the wheel-fork 7 of the wheel 8.

To section 2 is pivoted at 30 the curved lever 9, and to section 6 is pivoted at 31 the curved lever 10, the levers 9 and 10 being pivotally connected together and to the rod 11 by the bolt 12. The levers 9 and 10 are curved upward a considerable distance, forming a spreading yoke, which clears the row when the cultivator is spread. This also raises the pivot-joint, thus allowing the rod 11 to be more nearly horizontal than it would otherwise be and to operate with less resistance. The rod 11 is forked at its opposite end, forming the two arms 13 and 14. Pivotally connected to handle 1 at 15 and to arm 13 at 16 is the lever 17, and pivotally connected to handle 5 at 18 and to arm 14 at 19 is the lever 20. The levers 17 and 20 are pivotally connected together at 21. The lever 17 has formed thereon the segment 22, whose center is the pivot 21. This segment has a series of holes, in which the latch 23, pivoted to lever 20, is adapted to fit, thereby locking the handles in any desired position.

In each tool-frame are corresponding tool-sockets 24, 25, and 26, adapted to receive and clamp the stems of working-tools, preferably so arranged as to properly support tools fitted for various kinds of work. These sockets have two angular sides, with a set-screw opposite adapted to force the tool-stem against the sides and securely hold it. These sockets are arranged substantially equal distances apart across the frame, as shown in the drawings, and the frames are made with openings, so as to make them as light as possible.

In Figs. 1, 2, and 4 drag-teeth are shown attached to the cultivator, but these may be removed, and the weed-cutters of Figs. 5 and 6 or the plows of Fig. 7 may be substituted.

To the axle of each wheel is attached a guard 27, having the point 28, adapted to pass under a trailing vine and lift it onto the arm 29, which guides it out of the way of the wheel, thus protecting it from injury.

Whenever the operator desires to use the cultivator for working between a row of plants or for plowing, he adjusts it to the position shown in Fig. 2, and when he desires to have it straddle a row of plants and work on each side of the row he moves the lever 20 about the pivot 21 over the segment 22, thereby separating the two halves of the cultivator any desired distance, (one position being shown in Fig. 1,) the latch 23, operated by the spring 35, locking it in position. The fork-arms 13 and 14 are made light, so as to allow the ends to spring together or be spread apart as the position of the levers 17 and 20 is changed.

In place of the rod 11, having the forks 13 and 14, two separate rods may be used, one connecting pivots 12 and 16 and the other connecting pivots 12 and 19.

I make the horizontal distances between pivots 30 to 12, 31 to 12, 15 to 16 and 18 to 19 equal to each other, and the horizontal distances 30 to 15, 12 to 16, 12 to 19, and 31 to 18 equal to each other, so that the pivots 30 12 15 16 will be the corners of one parallelogram and the pivots 31 12 18 19 the corners of an equal parallelogram, and therefore when the lever 20 is moved each half of the cultivator will always be parallel to its original position and the cultivator-wheels always be parallel to each other.

Adjustment between the frames and wheel-forks is made by pivoting the forks to the frame at 34 and providing a slot 32 in the frame, in which a bolt passing through the fork and the frame is adapted to be moved up and down and fastened.

Having thus described my invention, what I claim, and desire to secure by Letters Patent, is—

1. A cultivator composed of two sections each consisting of a handle, a tool-frame and its wheel, an adjustable connection between said sections and means for adjusting said connection, adapted to be operated by the operator while standing in his usual working position between the handles, whereby the distance between said sections may be varied while maintaining parallelism, substantially as described.

2. In a cultivator the combination of two tool-carrying sections separable throughout their length, a spreading yoke adapted to extend over the row and to vary the distance between said sections and means adapted to be operated by the operator, while standing in his usual working position between the handles, for conjointly spreading said yoke and the handles of each section whereby said sections are adapted to be spread while maintaining their parallelism to the path of travel, for the purpose described.

3. A cultivator having two sections, each consisting of a handle, a tool-frame, means for fastening working-tools to said frame, a wheel and a guard attached to said wheel adapted to lift plants out of the way of said wheel, and an adjustable connection between said sections whereby the distance between them may be varied equally throughout their length and the guards and other working parts be brought to greater or less proximity at the will of the operator, while standing in his usual working position between the handles, substantially as described.

4. In a cultivator, two sections, each consisting of a handle and a tool-frame, a lever pivoted to each frame, said levers being pivoted together midway between said frames, a lever pivoted to each handle, said second levers being pivoted together midway between said handles, means for pivotally connecting the central pivot of said first levers with said second levers whereby when the position of said levers is changed the distance between the sections may be varied and each part will at all times occupy a position substantially parallel with its first position, for the purpose described.

5. The combination in a cultivator of two sections, each having a handle and a tool-frame, levers pivoted to each frame and pivoted together midway between said frames, levers pivoted to each handle and pivoted together midway between said handles, means for connecting the central pivot of said first-mentioned levers with said last-mentioned levers, whereby when the position of said levers is changed the distance between the parts of the cultivator may be varied and each part will at all times occupy a position substantially parallel with its first position, and means for rocking said second levers about their central pivot and securing them in any desired position, substantially as described.

6. In a cultivator, in combination with the wheel thereof, a guide projecting in front of said wheel and adapted to lift a vine from the ground allowing the cultivator to work thereunder, substantially as described.

7. In a cultivator, in combination with the wheels thereof, a pair of guides projecting in front of said wheels and adapted to lift a vine from the ground allowing the cultivator to work thereunder, and means whereby the distance between said guards may be varied, substantially as described.

8. In a cultivator, the combination of the handles 1 and 5, tool-frames 2 and 6, the levers 9 and 10 pivotally connected together to rod 11, said lever 9 being pivoted to frame 2 and lever 10 being pivoted to frame 6, levers 17 and 20 pivotally connected together, said lever 17 being pivotally connected to handle 1 and to arm 13 of rod 11, and lever 20 being pivotally connected to handle 5 and to arm 14 of rod 11 and means for securing said levers 17 and 20 in any desired position when they are rocked about their common pivot whereby the distance between the tool-frames is adjusted, substantially as described.

DAVID M. MOTHERWELL.

Witnesses:
R. T. SPENCER,
DWIGHT B. CHEEVER.